UNITED STATES PATENT OFFICE.

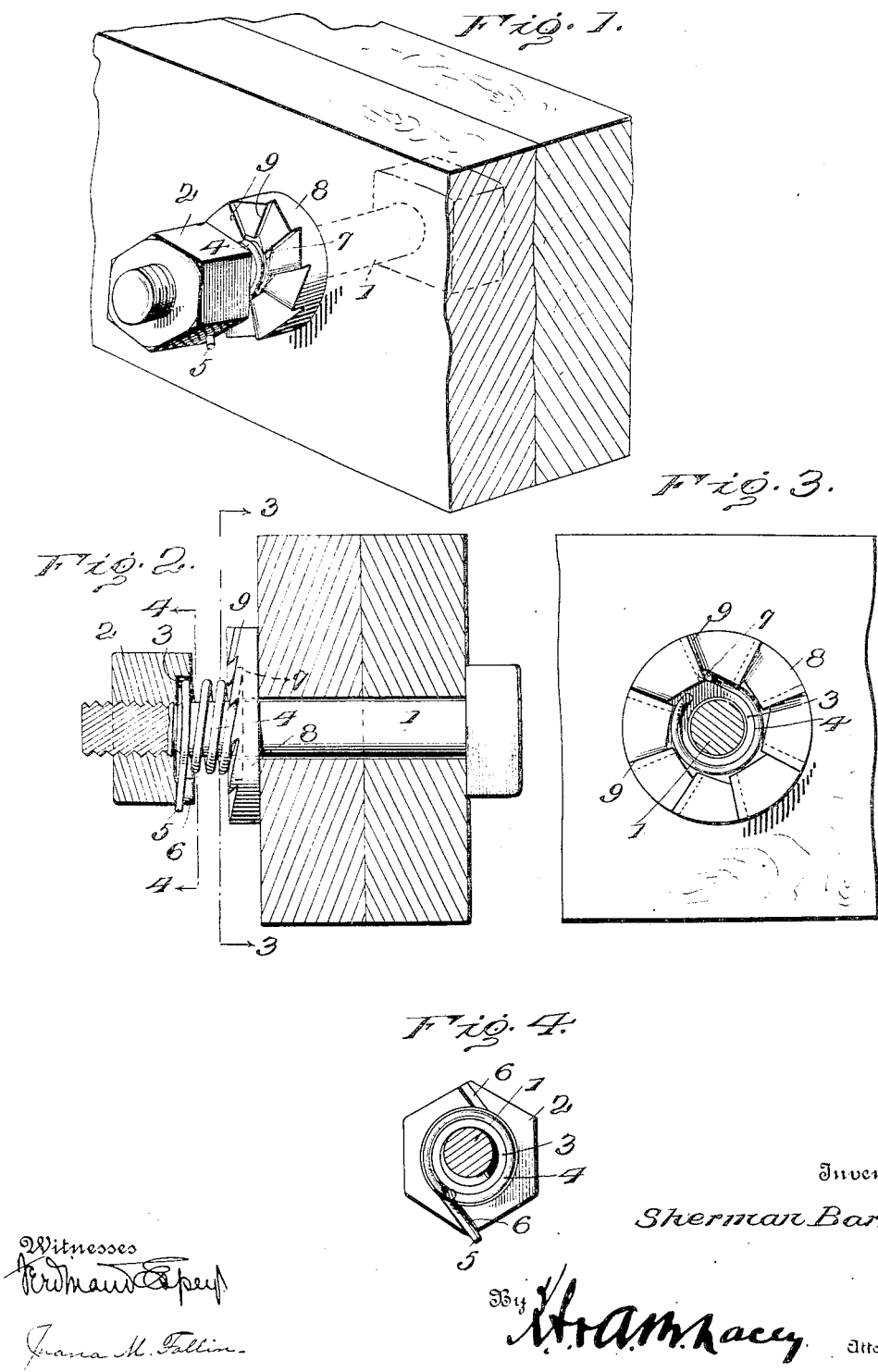

SHERMAN BARKER, OF OLA, IDAHO.

NUT-LOCK.

1,056,316.   Specification of Letters Patent.   Patented Mar. 18, 1913.

Application filed December 27, 1911. Serial No. 668,174.

*To all whom it may concern:*

Be it known that I, SHERMAN BARKER, a citizen of the United States, residing at Ola, in the county of Boise and State of Idaho, have invented certain new and useful Improvements in Nut-Locks, of which the following is a specification.

This invention relates to nut locks, and aims to simplify the construction, increase the efficiency and reduce the cost of manufacture of this class of devices.

A further aim of the invention is the production of a nut lock the accidental unscrewing of which is effectually prevented by a coiled spring interposed between the nut and a work engaging washer and detachably secured to the former.

With these and other aims in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which:

Figure 1 is a perspective of the improved nut lock in use; Fig. 2 is a partial elevation and vertical section of the same; Fig. 3 is a cross section on the line 3—3 of Fig. 2; Fig. 4 is a cross section on the line 4—4 of Fig. 2.

Corresponding and like parts are referred to in the following description and indicated in all the views of the drawing by the same reference characters.

In illustrating the invention, a standard bolt 1 is shown as passed through work indicated at A and secured in this position by the improved locking device. The locking device embodies an internally threaded nut 2 cut away on its inner face to produce a recess 3 concentric with the bore of the nut and adapted to receive and form a bearing for one end of a coiled member 4 which latter encircles the bolt and is held from movement independent of the nut 2 by a terminal extension 5. This terminal extension seats in either one of the grooves 6, said grooves being oppositely disposed and adapted to communicate with the recess 3 and are tangential thereto. Two of said grooves are provided so that the extension may be quickly and easily seated or changed from one groove to the other in case the first used groove should become worn.

The free end of the coiled member is undercut to produce a tooth 7 which bears against a washer 8 which latter has undercut ratchet teeth 9 formed therein, the opposite side of the washer being relatively smooth and adapted to frictionally engage the work. The washer 8 is formed with a concavity communicating with the opening thereof and with recesses in the side walls of the concavity.

It will be readily understood that when the nut 2 is advanced on the bolt 1 the coiled member 4 rotates with the nut and is compressed between the washer 8 and said nut, and thus exerts its tension as a separatory force on the two members, pressing the washer forcibly against the work and tending to wedge the nut on the bolt. When the pressure of the coiled member becomes sufficient the washer ceases to rotate and frictionally engages the work. The pressure of the coiled member tends to prevent the nut from rotating on the bolt and the toothed end 7 of the coiled member being in engagement with one of the teeth 9 acts to prevent unscrewing of the nut unless enough pressure is intentionally exerted thereon to overcome the tension of the coiled member and the friction between the washer and the work, when the nut may be removed in the usual way.

Attention is here directed to the construction of the coiled member 4 and the manner in which it acts. The terminal 5 of the coiled member is a natural extension of the end thereof and is disposed undistorted in the tangential groove 6 so that the extreme end of the terminal projects beyond the wall of the nut to provide means whereby the terminal 5 may be manually released when the nut is to be turned backwardly.

When the nut is rotated upon the bolt the coil is carried around therewith by reason of the terminal 5 being engaged in the slot 6, which movement causes the inner terminal 7 to consecutively engage the ratchet teeth of the washer. This movement of the nut likewise compresses the coils and causes them to act with some force outwardly against the nut and longitudinally of the bolt. By this means the nut is prevented from backward movement on the bolt and thus produces an efficient lock to hold the nut in position.

Having thus described the invention and set forth the merits thereof, what is claimed is:

In a nut lock a washer adapted to engage over a bolt and having a cavity communicating with the opening thereof, said cavity having lateral recesses in its side wall, a nut having a recess in its inner face, and a coil of wire encircling the opening in the nut and having its terminals extending tangentially thereof and engaging at one end in the nut recess and engaging consecutively at the other end with the recesses of the washer.

In testimony whereof, I affix my signature in presence of two witnesses.

SHERMAN BARKER. [L. S.]

Witnesses:
J. A. COUZENS,
S. E. SMITH.